United States Patent
Hobo

[19]
[11] Patent Number: 6,122,066
[45] Date of Patent: Sep. 19, 2000

[54] FACSIMILE EQUIPMENT TO PROVIDE COMMUNICATION BETWEEN A COMPUTER AND A REMOTE STATION

[75] Inventor: Yoshihiro Hobo, Hashima, Japan

[73] Assignee: Sanyo Electric Co., LTD, Osaka-fu, Japan

[21] Appl. No.: 08/739,931

[22] Filed: Oct. 30, 1996

[30] Foreign Application Priority Data

Oct. 30, 1995 [JP] Japan .................................. 7-281403

[51] Int. Cl.[7] .............................. H04N 1/00; H04N 1/32
[52] U.S. Cl. ...................... 358/1.15; 358/442; 358/434
[58] Field of Search ................... 358/434–436, 358/438–439, 442, 444, 468, 1.15, 1.16; H04N 1/32

[56] References Cited

U.S. PATENT DOCUMENTS

| | | | |
|---|---|---|---|
| H1677 | 9/1997 | Hu et al. ................................. | 358/468 |
| 5,428,458 | 6/1995 | Aiba et al. ............................. | 358/468 |
| 5,528,385 | 6/1996 | Manning ................................ | 358/442 |
| 5,684,607 | 11/1997 | Matsumoto ........................... | 358/442 |
| 5,696,606 | 12/1997 | Sakayama et al. ................... | 358/468 |
| 5,720,014 | 2/1998 | Ikeda et al. ........................... | 395/114 |
| 5,798,848 | 8/1998 | Ouchi .................................... | 358/468 |

FOREIGN PATENT DOCUMENTS

| | | | | |
|---|---|---|---|---|
| 62-249560 | 10/1987 | Japan | .............................. | H04N 1/32 |
| 7-212555 | 8/1995 | Japan | .............................. | H04N 1/32 |
| 7-264345 | 10/1995 | Japan | .............................. | H04N 1/32 |

*Primary Examiner*—Madeleine Nguyen
*Attorney, Agent, or Firm*—Darby & Darby

[57] ABSTRACT

A facsimile equipment of the present invention is a facsimile equipment which is constructed to comprise an interface which enables the facsimile equipment to communicate with a computer device, access to an opposite station on the basis of telephone number data of other stations sent from the computer device, and transmit data stored in the computer device to the opposite station through receiving data sent from the computer device and transmitting signals corresponded to the data; during communications, the facsimile equipment is controlled so as to answer to the computer device as if it had a reception from the opposite station, accumulate the data sent from the computer device following to the answer in the storage unit of the facsimile equipment, and transmit the data accumulated in the facsimile equipment to the opposite station on the basis of telephone number data of other stations indicated by the computer device, after that data accumulation is finished.

7 Claims, 6 Drawing Sheets

FACSIMILE EQUIPMENT TO PROVIDE COMMUNICATION BETWEEN A COMPUTER AND A REMOTE STATION

BACKGROUND OF THE INVENTION

1. Field of the Invention

The present invention relates to a facsimile equipment which can receive information of original documents controlled by a computer device through an interface and send the information directly to other facsimile equipment or the like in remote places.

2. Description of the Prior Arts

A facsimile equipment is a means which communicate text information electrically to remote places using telecommunication network or the like, and has basic construction to read information of original documents with a digital scanner using CCD or the like and transmit the information applying encoding compression process. Nowadays facsimile boards or the like for transmitting text information made by computer devices such as a personal computer device and a word processor directly by facsimile transmission have been developed, and interface between computer devices, facsimile boards, and facsimile equipment has been generalized (ex. EIA Standard Class 1,2). Accordingly, general-purpose facsimile communication application software (hereinafter it will be referred to as PCFAX application) have been supplied.

The general-purpose PCFAX application is supported with transmission function that information of original documents made by a computer device is directly sent to a facsimile equipment of an opposite station through a facsimile equipment connected to the computer device with an interface, and receiving function that information of original documents sent from a facsimile equipment of an opposite station is stored in a memory of a computer device.

When information of original documents made by a computer device is transmitted using the general-purpose PCFAX application to a facsimile equipment of an opposite station through a facsimile equipment connected to the computer device, however, the computer device and the facsimile equipment have to be connected to each other until whole transmission between the facsimile equipment and the computer device is completed. When the facsimile equipment of the opposite station is busy or when communication between two facsimile equipment cannot be completed because of default of telecommunication network or the like, the computer device therefore has to be connected to the facsimile equipment until re-transmission or other processes of the connected facsimile equipment is finished. During the process, utility of the computer device is restricted.

SUMMARY OF THE INVENTION

In view of above-described circumstances, the present invention has for its object to provide a facsimile equipment in which the time necessary for communication between the computer device and the facsimile equipment can be minimized even with existing general-purpose PCFAX applications. Consequently, the facsimile equipment can be disconnected from the computer device or cut off electrical power supply without waiting for completion of transmission.

The present invention is a facsimile equipment constructed to have an interface which enables the facsimile equipment to communicate with a computer device, access to an opposite station on the basis of telephone number data of other stations sent from the computer device, and transmit data stored in the computer device to the opposite station through receiving data sent from the computer device and transmitting signal corresponded to the data; the facsimile equipment comprises a means which output spurious answer signal in response to the computer device as if the equipment had a reception from the opposite station, a storage means in which data sent from the computer device on the basis of the answer signal is accumulated, and a control means which controls the facsimile equipment to send data accumulated in the storage means to the opposite station, on the basis of telephone number data instructed by the computer device, after accumulation of data from the computer device in the storage means is finished.

According to above-described construction, a general-purpose PCFAX application is started on the computer device, and at the file transmission sequence, data from the computer device is stored in a storage means of the facsimile equipment on the general-purpose PCFAX application, through answering to the computer device as if the equipment had a reception from the opposite station. After storing whole data from the computer device in the storage means, the facsimile equipment accesses to the opposite station on the basis of the stored data.

Namely, there is no need to change existing general-purpose PCFAX applications. And using the applications, the computer device can be disconnected from the facsimile equipment and cut off electrical power supply without waiting for completion of the communication.

The present invention further comprises a decoding means for decoding compressed image information data, a encoding means for compressing and encoding the image information data, and a conversion means for converting size and resolution of image information data which is decoded with the decoding means; capabilities of a facsimile equipment of an opposite station and the computer device are compared, and when they are not compatible, compressed image information data is decoded with the decoding means, size and resolution of the decoded image information data are converted with the conversion means, and the converted image information data is compressed and encoded with the encoding means to be transmitted to the opposite station.

Furthermore, the present invention is a facsimile equipment constructed to have an interface which enables the facsimile equipment to communicate with a computer device, access to an opposite station on the basis of telephone number data of other stations sent from the computer device, and transmit data stored in the computer device to the opposite station through receiving data sent from the computer device and transmitting signals corresponded to the data; the facsimile equipment comprises a storage means which stores result information of communications to other stations, a means which output spurious answer signal in response to the computer device as if the equipment gave a response to the opposite station, and a control means which controls the facsimile equipment to transmit the result data of communications to the computer device, on the basis of the spurious answer signal.

The present invention still comprises a means for converting the result information of communications into image and an encoding means for compressing and encoding image information data, and can be constructed to compress and encode the data converted into image to be transmitted to the computer device.

As above-described, the result of communications with other stations are stored inside of the facsimile equipment.

When the computer device performs the general-purpose PCFAX application, the result can be confirmed by the computer device through working as if the facsimile equipment had a reception.

The foregoing and other objects, features, aspects and advantages of the present invention will become more apparent from the following detailed description of the present invention when taken in conjunction with the accompanying drawings.

DESCRIPTION OF PREFERRED EMBODIMENTS

Figure 1:
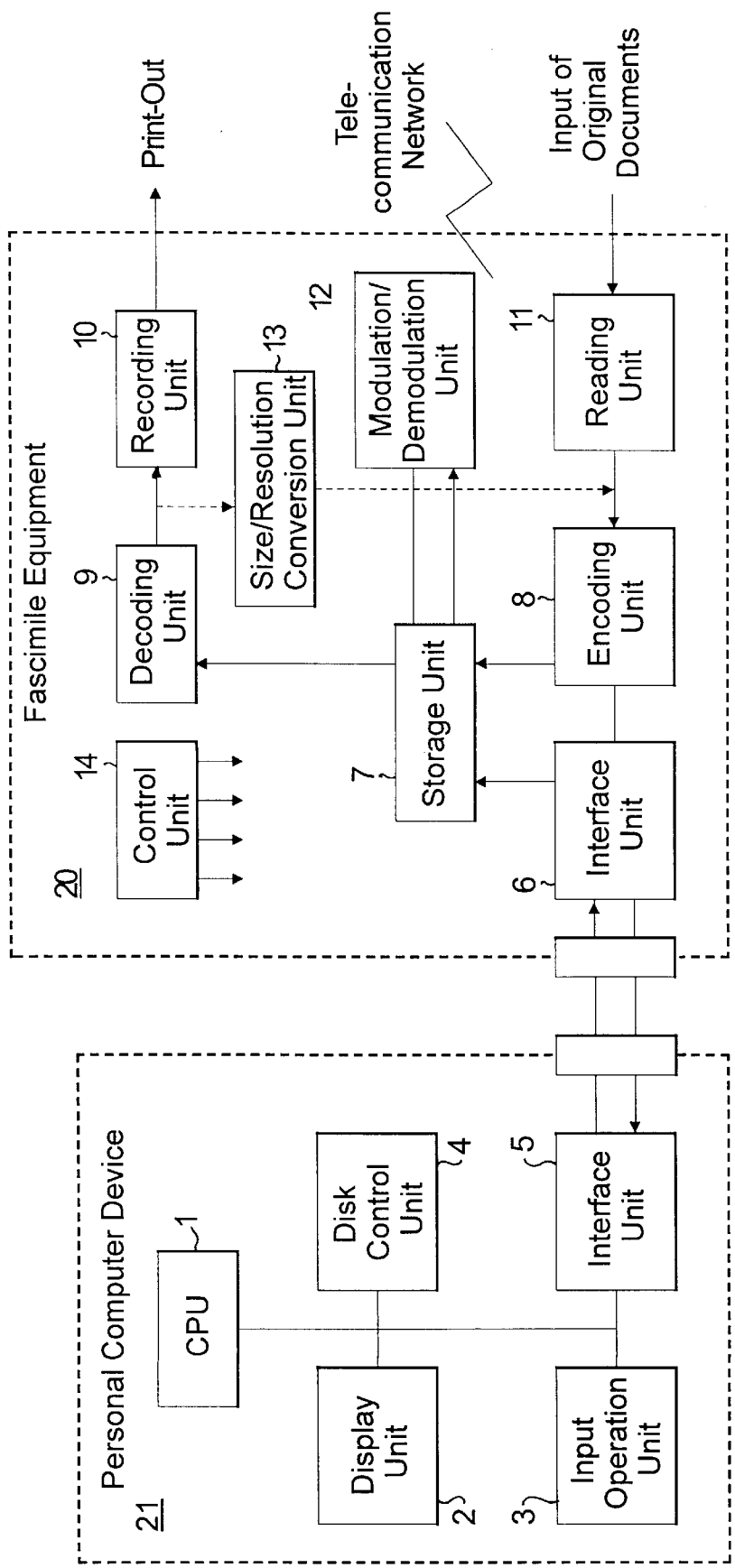
FIG. 1 is a block drawing showing diagrammatic construction of a facsimile equipment according to the present invention and a personal computer device connected thereto.

FIG. 1 is a block drawing showing diagrammatic construction of a facsimile equipment 20 according to the present invention and a personal computer device 21 connected thereto.

The personal computer device 21 comprises a CPU 1, a display unit 2 comprising such as a liquid crystal display and a CRT, a input operation unit 3 comprising such as a keyboard and a mouse, a disk control unit 4, and an interface unit 5. The disk control unit 4 reads the general-purpose PCFAX application from a disk which is not illustrated, and the CPU 1 performs the software. When the software is performed, the display unit 2 indicates request of inputting receiver identification and selective input of transmitted information.

An operator can specify telephone number of a receiver or file information to be transmitted using the input operation unit 3. The specified file information is converted into image data by above software, and encoding compression process such as MH, MR and MMR is applied thereon. The image data which is already compressed (hereinafter it will be referred to as compressed image data) is output from the interface unit 5 to the facsimile equipment 20 following to a facsimile communication protocol performed by above-described software.

Now description will be made of construction of the facsimile equipment 20.

An interface unit 6 is connected with the interface unit 5 of the personal computer device 21, whereby the personal computer device 21 and the facsimile equipment 20 are connected to each other. The facsimile equipment 20 is so constructed as to answer to a facsimile communication protocol performed by the computer device 21, through the interface unit 6, and communicate with a facsimile equipment of an opposite side through a facsimile communication protocol which originally exists in itself.

A storage unit 7 stores information input from the personal computer device 21 through the interface unit 6 and compressed image data which is compressed by an encoding unit 8.

Furthermore, the storage unit 7 stores compressed image data input from a facsimile equipment of an opposite side through a telecommunication network extended from a modulation/demodulation unit 12, and result information of communications requested by the personal computer device 21, which will be described later, is stored in the storage unit 7.

A decoding unit 9 decodes compressed image data which is input from the facsimile equipment of an opposite side through a telecommunication network extended from the modulation/demodulation unit 12 and stored in the storage unit 7, or compressed image data stored in the storage unit 7 from the personal computer device 21 through the interface unit 6. The decoded image information data from the facsimile equipment of the opposite side is output to a recording unit 10.

The compressed image data from the personal computer device 21 is decoded and given to a size/resolution conversion unit 13.

The recording unit 10 performs printing-out on the basis of the decoded image information data.

A reading unit 11 reads information of original documents with a digital scanner using CCD or the like, and output the image information to the encoding unit 8.

The encoding unit 8 encodes and compresses image information of original documents from a reading unit 11, and outputs the compressed image data to the storage unit 7. The compressed image data stored in the storage unit 7 is output to the modulation/demodulation unit 12.

In this embodiment, compressed image data which has already been compressed is stored in the storage unit 7 from the personal computer device 21. Under normal conditions, accordingly, the compressed image data read from the storage unit 7 is output to the modulation/demodulation unit 12 in unchanged condition.

In this embodiment, however, the storage unit 7 of the facsimile equipment 20 is constructed so as to store whole compressed image data from the personal computer device 21 before access to a facsimile equipment of an opposite side is performed. Therefore, size, resolution, and kinds of encoding of the compressed image data, which is compressed in the personal computer device 21, may be different from those of the facsimile equipment of the opposite side. In such a case, the compressed image data read from the storage unit 7 is decoded in the decoding unit 9, and the decoded data is converted to have proper size and resolution for the facsimile equipment of the opposite side, in the size/resolution conversion unit 13. For example, when compressed image data from the computer device 20 has a size of B4 and a facsimile equipment of the opposite side has that of A4, the compressed image data is first performed thinned-out process or the like to convert the size, encoded through a predetermined encoding method at encoding unit 8, and stored in the storage unit 7. Afterwards, the compressed image data is output to the modulation/demodulation unit 12.

The modulation/demodulation unit 12 is constructed to modulate the compressed image data from the storage unit 7 to proper signals for telecommunication network and demodulate modulated signals from telecommunication network to output to the storage unit 7. Each of above-described units is controlled by a control unit 14.

The control unit 14 further operates the facsimile equipment 20 to make the same reaction as in ordinary file transmission process to the personal computer device 21. Namely, the facsimile equipment 20 does not make dialing to telecommunication network. When the facsimile equipment 20 is not connected with a facsimile equipment of an opposite side, it gives confirmation answer to the personal computer device 21 as if signals corresponded to various commands therefrom were output to telecommunication network, without actually outputting such signals. Accordingly, the control unit 14 controls the facsimile equipment 20 to generate and send spurious reports of completed connection, spurious capability reports, and spurious reports of completed ending transmission phase procedure to the personal computer device 21.

Now description is made of operation of the facsimile equipment 20 and the personal computer device 21 of above-described constructions.

Figure 2A:
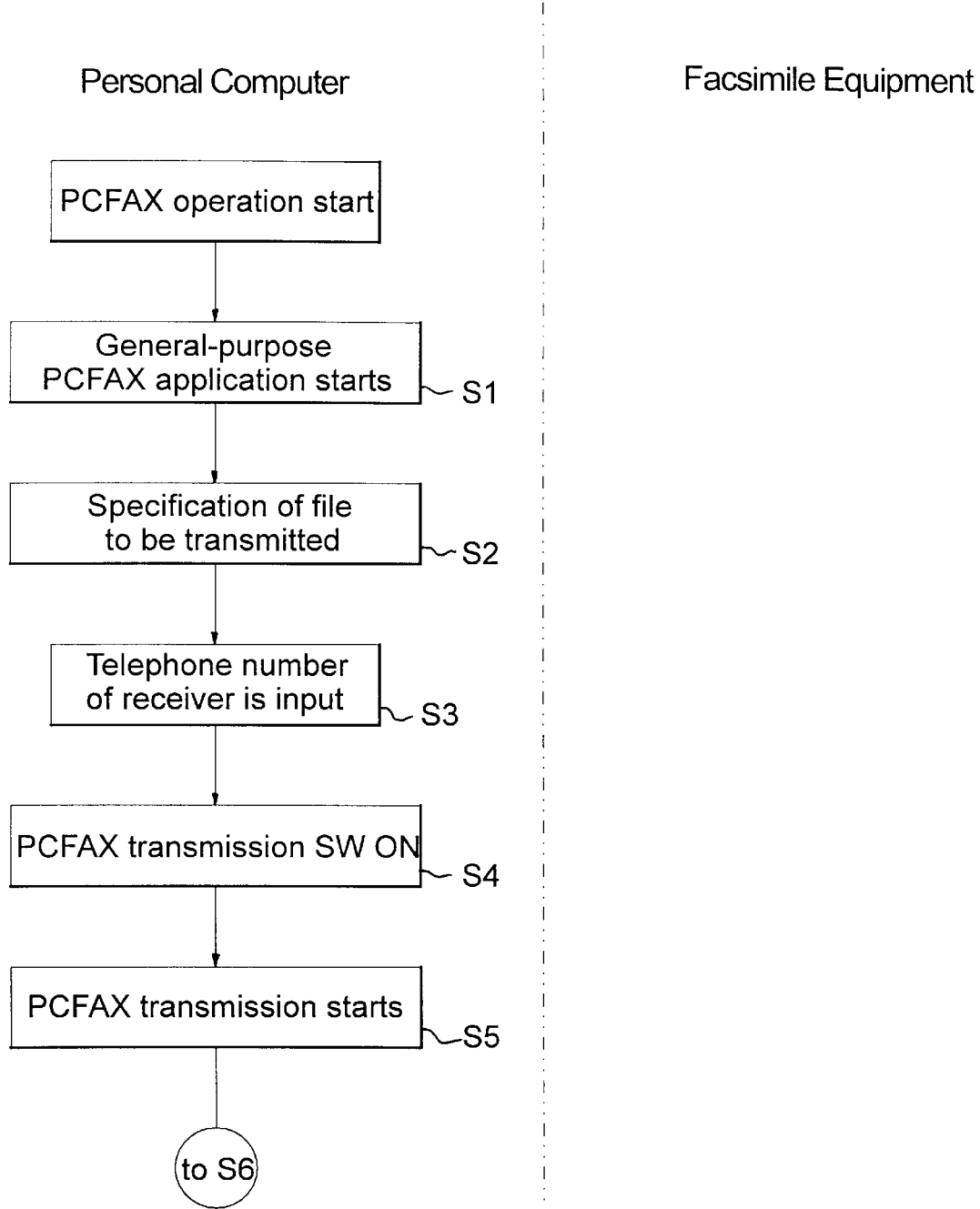
FIG. 2 is a flow chart showing how a file transmission process is performed in file transmission sequence of original documents by a general-purpose PCFAX application, in terms of relationship between a personal computer device and a facsimile equipment of self side.
Figure 2B:
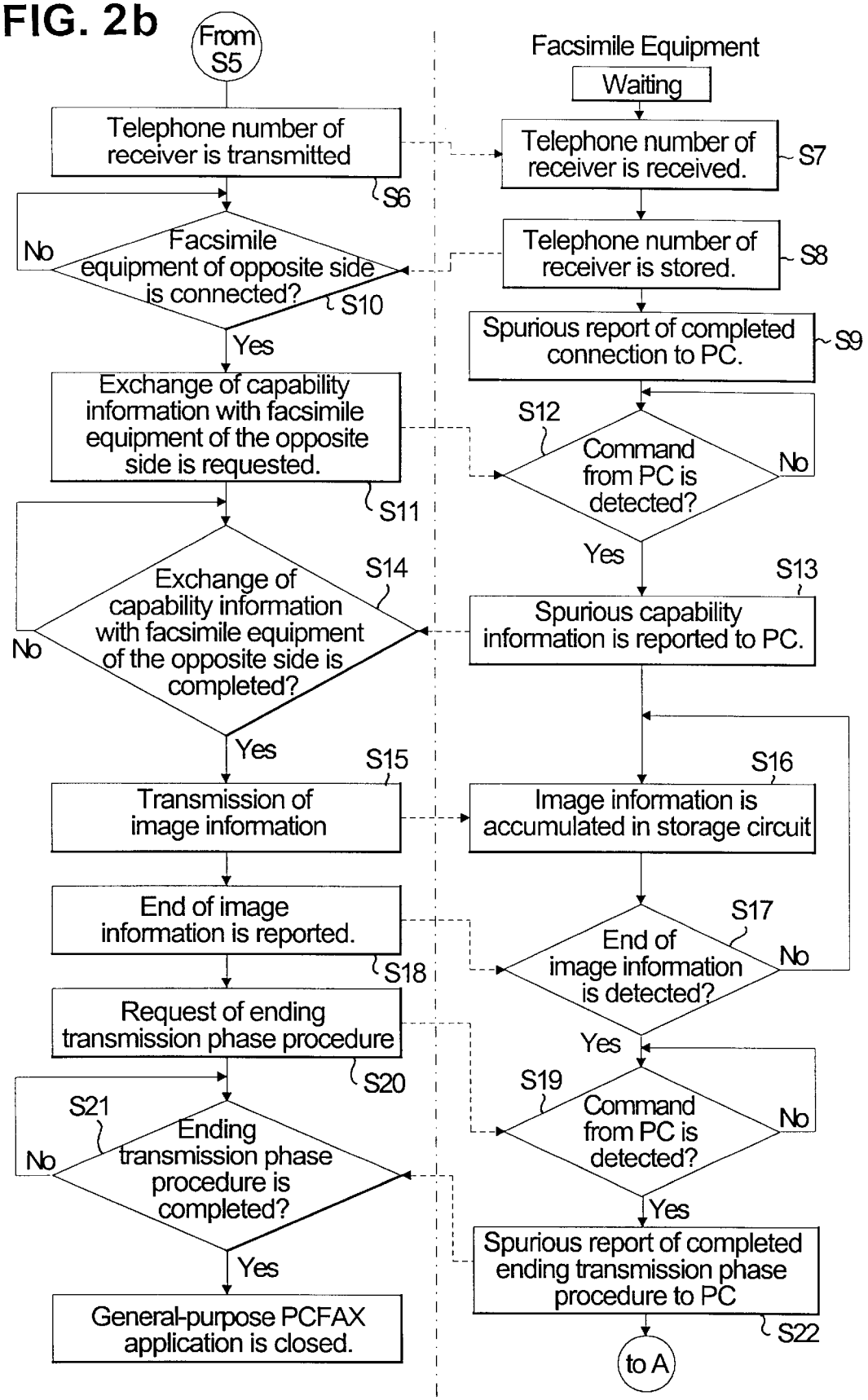
Figure 3:
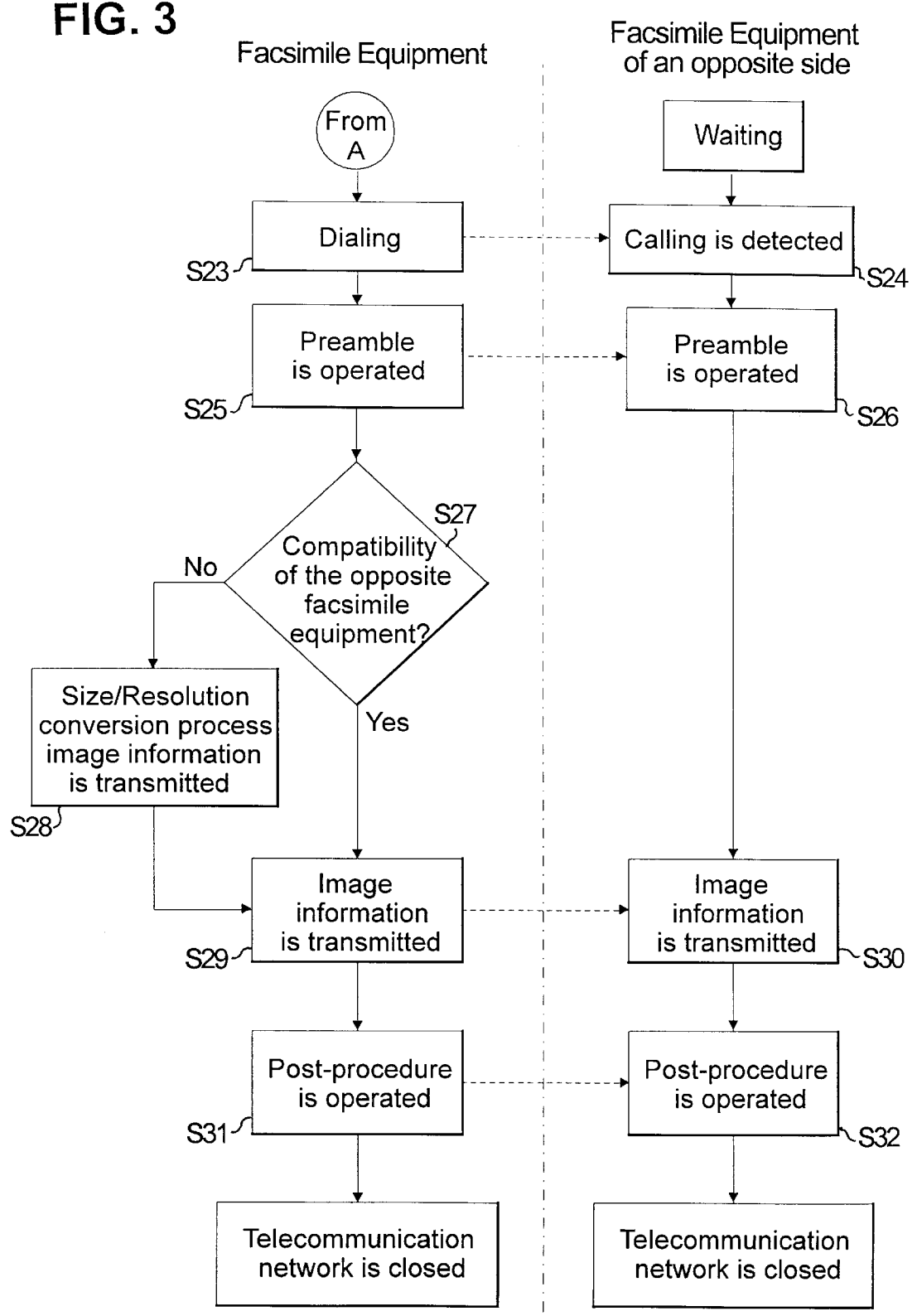
FIG. 3 is a flow chart showing a normally completed communication in terms of relationship between a facsimile equipment of self side and a facsimile equipment of an opposite side.
Figure 4:
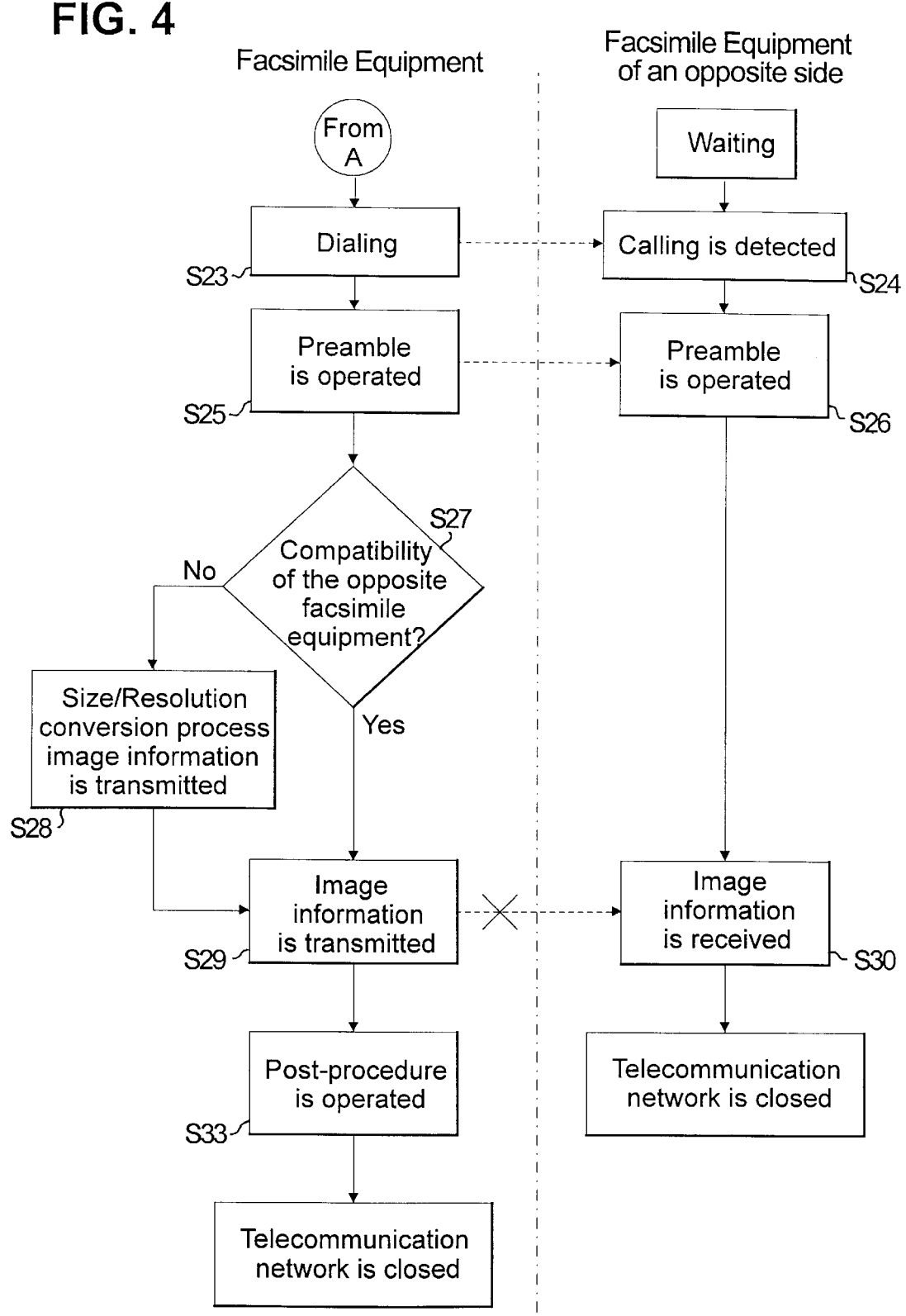
FIG. 4 is a flow chart showing an abnormally completed communication in terms of relationship between the facsimile equipment of self side and the facsimile equipment of an opposite side.
Figure 5:
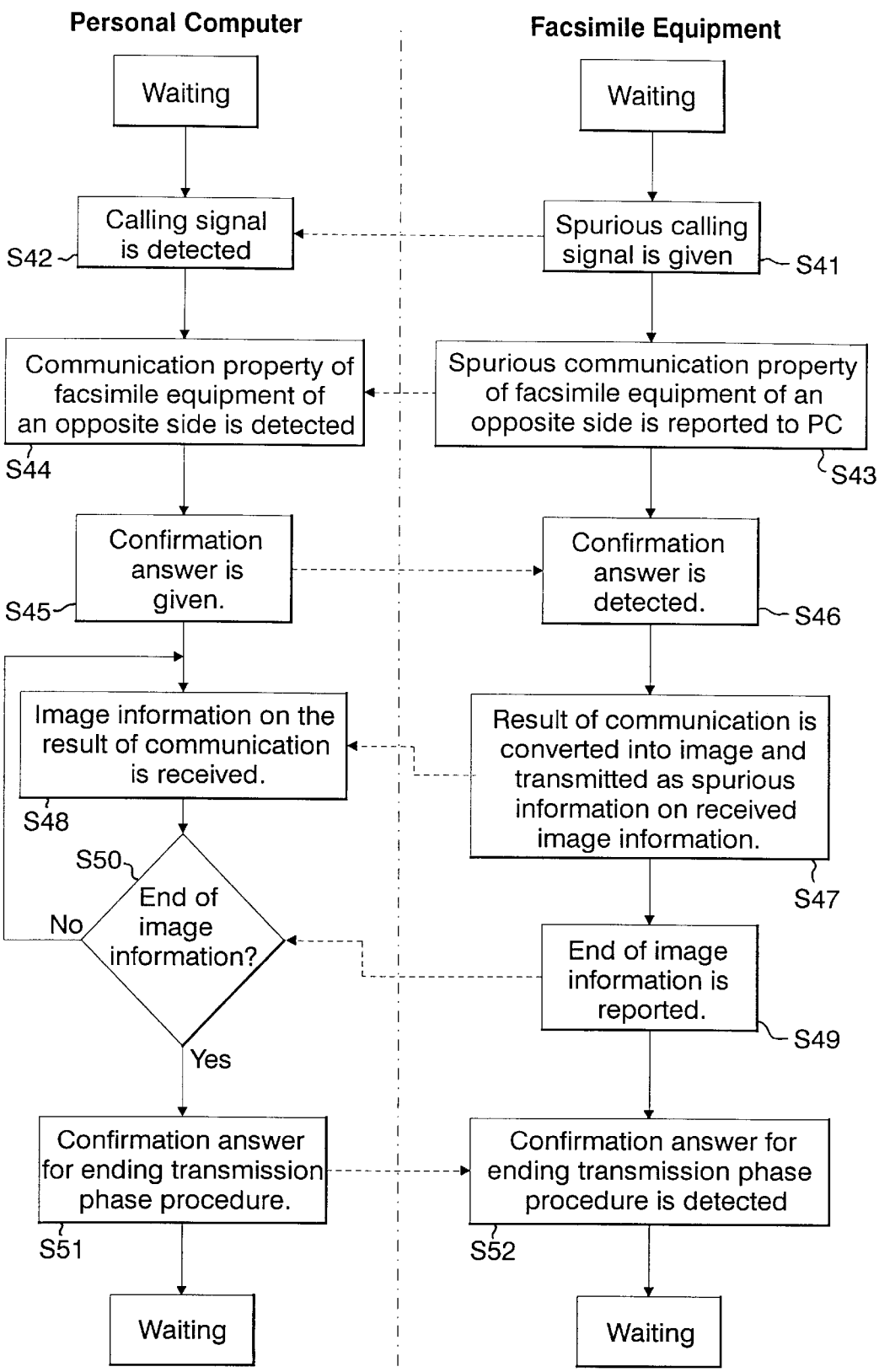
FIG. 5 is a flow chart showing how the result of communication is transmitted in terms of relationship between the personal computer device and the facsimile equipment of self side.

FIG. 2 is a flow chart showing how a file transmission process is performed in file transmission sequence of original documents by a general-purpose PCFAX application, in terms of relationship between the personal computer device 21 and the facsimile equipment 20 of self side. FIG. 3 is a flow chart showing a normally completed communication in terms of relationship between the facsimile equipment of self side and a facsimile equipment of an opposite side. FIG. 4 is a flow chart showing an abnormally completed communication in terms of relationship between the facsimile equipment of self side and a facsimile equipment of an opposite side. FIG. 5 is a flow chart showing how the result of communication is transmitted in terms of relationship between the personal computer device 21 and the facsimile equipment 20 of self side.

First an operator starts a general-purpose PCFAX application for starting file transmission of original documents (PCFAX operation) at the side of the personal computer device (PC) 21 (step S1). Then the operator specifies a file to be transmitted using the input operation unit 3 (step S2), inputs telephone number information of a receiver (step S3), and presses a return key for PCFAX transmission (step S4), accordingly the general-purpose PCFAX application starts (step S5).

When the general-purpose PCFAX application starts, above-described telephone number information of receiver is sent from the interface unit 5 of the personal computer device 21 to the facsimile equipment 20, as dial commands and dial information. The facsimile equipment 20 receives the dial command and the dial information as the telephone number information of the receiver (step S7) and stores the dial information or the like (step S8).

In this embodiment, the general-purpose PCFAX application is used in unchanged condition. The personal computer device 21 is therefore dealt with as if it communicates with a facsimile equipment of an opposite side through the facsimile equipment 20, although it has not dialed to the facsimile equipment of the opposite side.

The facsimile equipment 20 operates to make the same reaction to the personal computer device 21 as in ordinary file transmission process, to perform the general-purpose PCFAX application process. In this condition, however, the facsimile equipment 20 has not made dialing to telecommunication network and is not connected to the facsimile equipment of the opposite side. Accordingly, it gives confirmation answer to the personal computer device 21 as if signals corresponded to various commands therefrom were output to telecommunication network, without actually outputting such signals. Therefore, the facsimile equipment 20 sends a spurious report of completed connection to the personal computer device 21 (step S9), and the personal computer device 21 judges that connection to the facsimile equipment of the opposite side is confirmed (step S10) and requests exchange of capability information therebetween (step S11).

When the facsimile equipment 20 detects commands from the personal computer device 21 (step S12), it informs spurious capability information (step S13). As the capability information on the facsimile equipment, the capability information on the facsimile equipment 20 of self side is used, and spurious signals are generated as information on telecommunication network diagnostic answer or the like against telecommunication network diagnostic commands to be transmitted to the personal computer device 21.

When the personal computer device 21 judges on the spurious capability information sent from the facsimile equipment 20 that exchange of information is completed (step S14), the interface unit 5 sends compressed image data to the facsimile equipment 20 using capability under the best condition for both (step S15).

The facsimile equipment 20 stores the compressed image data transmitted from the personal computer device 21 in the storage unit 7 through the interface unit 6.

As in the case of above-described information on telecommunication network diagnostic answer, spurious signals are generated as information confirming the end of message or the like against the signals confirming the end of message from a facsimile equipment of the opposite side, and transmitted to the personal computer device 21. The facsimile equipment 20 stores the compressed image data in the storage unit 7 (step S17) until the report of completed image information is sent from the personal computer device 21 (step S18). When the facsimile equipment 20 detects the report of completed image information, it waits until command for execution of ending transmission phase procedure from the personal computer device 21 is detected (step S19).

When the command for execution of ending transmission phase procedure is sent from the personal computer device 21 (step S20), the facsimile equipment 20 sends spurious report of completed ending transmission phase procedure to the personal computer device 21 (step S22). If the personal computer device 21 judges that the ending transmission phase procedure is completed (step S21), the general-purpose PCFAX application is closed. When the general-purpose PCFAX application is closed, the personal computer device 21 can be disconnected from the facsimile equipment 20 and cut off power supply.

As above-described, compressed image data can be obtained from the personal computer device 21 using the general-purpose PCFAX application, by starting the general-purpose PCFAX application on the personal computer device 21 and answering to the personal computer device 21 as if the facsimile equipment 20 had a reception from an opposite side through input operation at file transmission sequence. The compressed image data can be stored in the storage unit 7 of the facsimile equipment 20. The facsimile equipment 20 starts transmission of the compressed image stored therein to the facsimile equipment of the opposite side after completion of procedure with the personal computer device 21.

As shown in FIG. 3, the facsimile equipment 20 makes dialing to telecommunication network (telecommunication switchboard) on the basis of information from the personal computer device 21 (step S23). The telecommunication network receives the dialing and calls the facsimile equipment of the opposite side with calling signal.

The facsimile equipment of the opposite side detects the calling signal (step S24) and connects to telecommunication network. When two facsimile equipment are connected, preambles on the basis of facsimile communication protocol is executed (steps S25 and S26). As a preamble, the facsimile equipment of the opposite side transmits capability disclosure signal of the facsimile equipment which shows capability of its own to telecommunication network. The facsimile equipment 20 receives the capability disclosure signal of the facsimile equipment, selects necessary information, compares it to the capability determined by the personal computer device 21 and the facsimile equipment 20, and further compares the determined capability of the equipment and capability of the facsimile equipment of the opposite side to judge whether both capabilities are compatible or not (step S27).

When they are judges to be compatible, the compressed image data given from the personal computer device 21 to the storage unit 7 of the facsimile equipment 20 and stored therein is transmitted in unchanged condition to the facsimile equipment of the opposite side (step S29).

When they are judges to be incompatible, namely when size, resolution, and kinds of encoding of the compressed image data compressed in the personal computer device 21 is different from those of the facsimile equipment of the opposite side, the compressed image data read from the storage unit 7 is decoded at decoding unit 9, the decoded data is converted to have proper size and resolution for the facsimile equipment of the opposite side at size/resolution conversion unit 13, the converted data is encoded through optimum encoding method between two facsimile equipment at the encoding unit 8, and the encoded image is stored in the storage unit 7 (step S28). The compressed image data stored therein is transmitted to the facsimile equipment of the opposite side (step S29).

As the preamble, the facsimile equipment 20 transmits transmission requesting signal to the facsimile equipment of the opposite side. The facsimile equipment of the opposite side transmits answer signal for confirming operation against the transmission request command.

After receiving the answer signal for confirming operation, the facsimile equipment 20 transmits telecommunication network diagnostic command for confirming condition of telecommunication network to the facsimile equipment of the opposite side.

If the facsimile equipment of the opposite side can receive the telecommunication network diagnostic signal in normal condition, it transmits answer signal to the telecommunication network diagnostic to the facsimile equipment 20.

After receiving answer signal to the telecommunication network diagnostic, the facsimile equipment 20 confirms the answer information to the telecommunication network diagnostic and transmits compressed image data to the facsimile equipment of the opposite side. During such preambles, if two facsimile equipments are not compatible, processes of the decoding unit 9, size/resolution conversion unit 13, and the encoding unit 8 are applied to make compatibility.

The facsimile equipment 20 transmits the compressed image data stored in the storage unit 7 to the facsimile equipment of the opposite side as compressed image data signal.

The facsimile equipment of the opposite side converts into images and prints out the compressed image data signal which is successively transmitted. If the equipment is a facsimile equipment having memory or the like, printing out starts after receiving whole compressed image data.

After transmitting image information for one page, the facsimile equipment of the opposite side transmits answer signal for confirming the end of message to the facsimile equipment 20.

If the facsimile equipment 20 confirms the confirmation response signal and finishes transmission of whole compressed image data, post-procedures are operated between two facsimile equipment (steps S31 ad S32). As a post-procedure, the facsimile equipment 20 transmits signals indicating the end of message to the facsimile equipment of the opposite side.

The facsimile equipment of the opposite side sends back confirmation signals for the end of message after confirming the signals indicating the end of message.

The facsimile equipment 20 receives the confirmation signals for the end of message and transmits telecommunication network closing signal to the facsimile equipment of the opposite side.

Now description is made of a abnormally completed communication in relationship between the facsimile equipment of self side and the facsimile equipment of the opposite side, referring to FIGS. 4 and 5.

As shown in FIG. 4, and as shown in FIG. 3, the facsimile equipment 20 makes dialing on the basis of information from the personal computer device 21 (step S23), and the facsimile equipment of the opposite side detects the calling signal and connects to telecommunication network (step S24). When two facsimile equipments are connected, preambles on the basis of facsimile communication protocols are executed (steps S25 and S26). When the preambles are executed, the capability information of facsimile equipment and capability of equipment determined by the personal computer device 21 and the facsimile equipment 20 are compared, and the determined capability of the equipment and capability of the facsimile equipment of the opposite side are compared for judging if capabilities of two equipment are compatible (step S27).

When they are judged to be compatible, the compressed image data given from the personal computer device 21 to the storage unit of the facsimile equipment 20 and stored therein is transmitted to the facsimile equipment of the opposite side in unchanged condition (step S29).

When they are judged to be incompatible, the data is converted to have proper size and resolution for the facsimile equipment of the opposite side, encoded in the optimum encoding method for two facsimile equipment, and stored in the storage unit 7 (step S28). The compressed image data is transmitted to the facsimile equipment of the opposite side (step S29).

The facsimile equipment 20 transmits the compressed image data stored in the storage unit 7 to the facsimile equipment of the opposite side, and the facsimile equipment of the opposite side receives the compressed image data (step S30). If there are some troubles on the communication between two facsimile equipments because of telecommunication network troubles or the like, the facsimile equipment of the opposite side does not transmit signals of post-procedures. As a result, the facsimile equipment 20 executes post-procedure to close the telecommunication network (step S33), and the telecommunication network is closed.

In this embodiment, the facsimile equipment 20 reports spurious completed procedure in the condition that communication is normally completed to the personal computer device 21, no matter how the communication with the facsimile equipment of the opposite side is completed. Accordingly, the personal computer device 21 cannot judge whether communication with the facsimile equipment 20 is normally completed or there are troubles in the communication.

Considering the situation, in this embodiment, the facsimile equipment 20 is constructed so as to know the result of communication, when the communication between the facsimile equipment 20 and the facsimile equipment of the opposite side is abnormally completed.

When the communication is not normally completed, first the facsimile equipment 20 stores the result in the storage unit 7. When the personal computer device 21 executes the general-purpose PCFAX application, the facsimile equipment 20 operates as if it gave a reception, so that the result can be grasped by the personal computer device 21.

As shown in FIG. 5, when the general-purpose PCFAX application of the personal computer device 21 is started, the facsimile equipment 20 gives spurious signal of detected calling to the personal computer device 21 as if the equipment 20 had a calling from the facsimile equipment of the opposite side (step S41). The personal computer device 21 detects the calling signal and carry out the same operation with that when it had an ordinary calling from a facsimile equipment (step S42).

Successively, the facsimile equipment 20 transmits spurious communication property of the facsimile equipment of the opposite side to the personal computer device 21 (step S43). The personal computer device 21 detects the information on communication property of the facsimile equipment of the opposite side (step S44) and sends answer report for confirmation to the facsimile equipment 20 (step S46).

During the procedure, information on telephone number of the receiver is a predetermined number, to distinguish from normal receiving.

After detecting the answer report for confirmation (step S46), the facsimile equipment 20 converts information on storage of the results of communications stored in the storage unit 7 into images, encodes the data to facsimile codes at the encoding unit 7, and transmits to the personal computer device 21 as spurious information on received images (step S48). When binary-file transmission function is used, it is not necessary to convert the information into images.

The personal computer device 21 receives the information on storage of the result of the communication (step S48), waits until the information of completed image is sent from the facsimile equipment 20 (steps S49 and S50). After detecting the information of completed image, the device 21 transmits answer signal for confirmation of the ending transmission phase procedure (step S51). When the facsimile equipment 20 detects the answer signal for confirmation of the ending transmission phase procedure (step S52), spurious communication between two facsimile equipment is finished.

Whether the information requested to be transmitted is abnormal or not can be confirmed by opening a file received through spurious receiving from a station of predetermined telephone number on the basis of receiving information in the personal computer device 21.

In above description, the operations are controlled to be automatically operated by the facsimile equipment only when there are some troubles on communications requested by the personal computer device 21. However, it is also possible that the operations are carried out for all communications requested by the personal computer device 21.

Although the present invention has been described and illustrated in detail, it is not clearly understood that the same is by way of limitation, the spirit and scope of the present invention being limited only by the terms of the appended claims.

What is claimed is:

1. Facsimile equipment having an interface which enables said facsimile equipment to communicate with a computer device, provide access to an opposite station on the basis of telephone number data concerning the opposite station sent from the computer device, and transmit data originally stored in the computer device to the opposite station after receiving the data from the computer device, said facsimile equipment comprising:

means for sending a spurious report of connection to the computer device as if the computer device is actually connected, through the facsimile equipment, to the opposite station, storage means for storing data sent from the computer device in response to the computer device receiving said spurious report of connection;

means for sending a spurious report of completed transmission to the computer device to report to the computer device as if transmission to the opposite station is completed after accumulation of data sent from the computer device in said storage means is finished even when said facsimile equipment is not in communication with the opposite station; and control means for controlling said facsimile equipment to actually transmit data accumulated in said storage means to the opposite station on the basis of telephone number data indicated by the computer device after the spurious report of completed transmission is sent to the computer device, and to place the connection between the facsimile equipment and computer device in an off line state during the time the facsimile equipment transmits data to the opposite station.

2. The facsimile equipment according to claim 1, wherein the data sent from the computer device to said facsimile equipment is compressed image information data.

3. The facsimile equipment according to claim 1 wherein said facsimile equipment further comprises a decoding means for decoding compressed image information data, an encoding means for compressing and encoding the image information data, and a conversion means for converting size and resolution of the image information data decoded by said decoding means, wherein said facsimile equipment compares the capabilities of facsimile equipment of the opposite station and the computer device, and when they are not compatible, said facsimile equipment causes: (1) said decoding means to decode the compressed image information data, (2) said comparison means to convert the size and resolution of the decoded image information data, and (3) the encoding means to compress and encode the converted image information data to be sent to the opposite station.

4. Facsimile equipment having an interface which enables said facsimile equipment to communicate with a computer device, provide access to an opposite station on the basis of telephone number data concerning the opposite station sent from the computer device to the facsimile equipment, and transmit data originally stored in the computer device to the opposite station after receiving the data from the computer device, said facsimile equipment comprising:

means for sending a spurious report of connection to the computer device as if the computer device is actually connected, through the facsimile equipment, to the opposite station;

storage means for storing data sent from the computer device in response to the computer device receiving said spurious report of connection;

means for sending a spurious report of completed transmission to the computer device as if transmission to the opposite station is completed after storage of the data sent from the computer device in said storage means is finished;

control means for controlling said facsimile equipment to actually transmit the data received from the computer device and stored in said storage means to the opposite station on the basis of telephone number data indicated by the computer device after the spurious report of completed transmission is sent to the computer device, and to place the connection between the facsimile equipment and computer device in an off line state during the time the facsimile equipment transmits data to the opposite station;

said storage means also storing information of the result of actually establishing communication between said facsimile equipment and the opposite station;

means responsive to the storing of the information on the result of actually establishing communication to said storage means if finished for operating said control means to have said facsimile equipment transmit the data stored in said storage means to the opposite station; and means for sending to the computer device at a time when normal communication cannot be achieved between said facsimile equipment and the opposite station a spurious detection report of a received message which reports to the computer device as if a message of completion of normal communication with the opposite station was detected;

said control means controlling said facsimile equipment to transmit to said computer device said information of the result of establishing actual communication stored in said storage means as spurious image information of communication as if actually being in communication with the opposite station.

5. The facsimile equipment according to claim 4, wherein the data sent from the computer device to said facsimile equipment is compressed image information data.

6. The facsimile equipment according to claim 4 wherein said facsimile equipment further comprises a decoding means for decoding compressed image information data, an encoding means for compressing and encoding the image information data, and a conversion means for converting size and resolution of the image information data decoded by said decoding means, wherein said facsimile equipment compares the capabilities of facsimile equipment of the opposite station and the computer device, and when they are not compatible, said facsimile equipment causes: (1) said decoding means to decode the compressed image information data, (2) said comparison means to convert the size and resolution of the decoded image information data, and (3) the encoding means to compress and encode the converted image information data to be sent to the opposite station.

7. The facsimile equipment according to claim 4 wherein said facsimile equipment further comprises a means for converting said information on the result of communication into image information data and an encoding means for compressing and encoding image information data, wherein said information of the result of access which is converted into image information data is compressed and encoded by said encoding means to be transmitted to said computer device.

* * * * *